United States Patent
Khan

(10) Patent No.: US 11,288,079 B2
(45) Date of Patent: Mar. 29, 2022

(54) REDUCING CLASSLOADING OF HIERARCHICALLY CONFIGURED APPLICATIONS VIA PROVISIONING

(71) Applicant: Red Hat, Inc., Raleigh, NC (US)

(72) Inventor: Kabir Khan, Farnborough (GB)

(73) Assignee: Red Hat, Inc., Raleigh, NC (US)

( * ) Notice: Subject to any disclaimer, the term of this patent is extended or adjusted under 35 U.S.C. 154(b) by 528 days.

(21) Appl. No.: 15/879,818

(22) Filed: Jan. 25, 2018

(65) Prior Publication Data

US 2019/0227819 A1    Jul. 25, 2019

(51) Int. Cl.
| | | |
|---|---|---|
| G06F 9/445 | (2018.01) | |
| G06F 9/448 | (2018.01) | |
| G06F 8/61 | (2018.01) | |
| H04L 67/10 | (2022.01) | |
| H04W 4/60 | (2018.01) | |
| H04L 47/783 | (2022.01) | |

(52) U.S. Cl.
CPC ............ *G06F 9/44521* (2013.01); *G06F 8/61* (2013.01); *G06F 9/4492* (2018.02); *H04L 47/783* (2013.01); *H04L 67/10* (2013.01); *H04W 4/60* (2018.02)

(58) Field of Classification Search
CPC ..................................... G06F 8/61; G06F 8/65
USPC ................................................. 717/168–178
See application file for complete search history.

(56) References Cited

U.S. PATENT DOCUMENTS

| | | | | |
|---|---|---|---|---|
| 7,665,087 B1 * | 2/2010 | Bosschaert | ......... | G06F 9/44521 717/166 |
| 8,370,832 B2 * | 2/2013 | White | ................... | G06F 9/4856 718/1 |
| 9,009,294 B2 * | 4/2015 | Dawson | ................ | G06F 9/5072 709/224 |

(Continued)

OTHER PUBLICATIONS

Author Unknown, "Class Loading in WildFly," WildFly 10, Project Documentation Editor, docs.jboss.org/author/display/WFLY10/Class+Loading+in+WildFly, accessed on Oct. 10, 2017, 9 pages.

(Continued)

*Primary Examiner* — Wei Y Zhen
*Assistant Examiner* — Binh Luu
(74) *Attorney, Agent, or Firm* — Withrow & Terranova, PLLC

(57) ABSTRACT

Reducing classloading of hierarchically configured applications via provisioning is disclosed. In one example, a hierarchically configured application is launched within a first container of a container application platform according to a set of resource descriptions that define a structure of the hierarchically configured application, valid operations may be performed by elements of the hierarchically configured application, and handlers for each operation. After the process of loading the classes representing the resource descriptions and operation handlers is performed, services to be used by the hierarchically configured application are installed. The state of each service is then determined, and one or more serialized data structures representing the state of the services is generated. Subsequently, the hierarchically configured application is launched within a second container, with the serialized data structures being used to install the services within the second container while incurring lower classloading overhead.

2 Claims, 15 Drawing Sheets

(56) References Cited

U.S. PATENT DOCUMENTS

| | | | | |
|---|---|---|---|---|
| 9,250,891 | B1* | 2/2016 | Beranek | G06F 8/70 |
| 9,274,811 | B1* | 3/2016 | Reeves | G06F 8/61 |
| 9,928,058 | B1* | 3/2018 | Beranek | G06F 9/45504 |
| 2002/0035645 | A1* | 3/2002 | Tuatini | G06F 9/541 |
| | | | | 719/310 |
| 2006/0190469 | A1* | 8/2006 | Kathuria | G06F 9/4493 |
| 2007/0089111 | A1* | 4/2007 | Robinson | G06F 21/53 |
| | | | | 718/1 |
| 2009/0276660 | A1* | 11/2009 | Griffith | G06F 11/1438 |
| | | | | 714/16 |
| 2009/0320045 | A1* | 12/2009 | Griffith | H04L 67/34 |
| | | | | 719/315 |
| 2011/0126207 | A1* | 5/2011 | Wipfel | H04L 9/3213 |
| | | | | 718/104 |
| 2013/0263123 | A1* | 10/2013 | Zhou | G06F 9/45504 |
| | | | | 718/1 |
| 2015/0378691 | A1* | 12/2015 | Chouhan | G06F 8/31 |
| | | | | 717/106 |
| 2017/0249177 | A1* | 8/2017 | Liggitt | G06F 9/45558 |

OTHER PUBLICATIONS

Author Unknown, "Docker service inspect," Docker Documentation, docs.docker.com/engine/reference/commandline/service_inspect/, accessed on Oct. 10, 2017, Docker Inc., 9 pages.

Author Unknown, "Infinispan 9.1 User Guide," The Infinispan community,infinispan.org/docs/stable/user_guide/user_guide.html#indexing_and_querying, Jul. 31, 2017, 479 pages.

Author Unknown, "Inspect a service on the swarm," Docker Documentation, docs.docker.com/engine/swarm/swarm-tutorial/inspect-service, accessed Oct. 10, 2017, Docker, Inc., 6 pages.

Author Unknown, "Marshalling," Infinspan 6.0, Project Documentation Editor, docs.jboss.org/author/display/ISPN/Marshalling, accessed Oct. 10, 2017, 6 pages.

Paraiso, Fawaz, et al., "A Federated Multi-Cloud PaaS Infrastructure," International Conference on Cloud Computing, Jun. 2012, Hawaii, United States, pp. 392-399.

* cited by examiner

REDUCING CLASSLOADING OF HIERARCHICALLY CONFIGURED APPLICATIONS VIA PROVISIONING

TECHNICAL FIELD

The examples relate generally to deployment of hierarchically configured applications, and, in particular, to providing mechanisms for reducing resource consumption by hierarchically configured applications deployed in cloud-based environments.

BACKGROUND

Enterprise application platforms (EAPs), such as Red Hat's WildFly, may be used to implement a "hierarchically configured" application defined by a hierarchical structure of resource descriptions and operation handlers implemented as individual classes. Conventional EAPs may provide advanced management models and application programming interfaces (APIs), but at a cost of requiring numerous classes to be loaded at launch.

SUMMARY

The examples include reducing classloading of hierarchically configured applications via provisioning. To prepare a hierarchically configured application for execution within a container provided by a container application platform, a provisioning operation is performed by the container application platform. Using a first container (e.g., a specially configured provisioning container), the container application platform launches the hierarchically configured application according to a set of resource descriptions that define the structure of the hierarchically configured application, the valid operations that may be performed by elements of the hierarchically configured application, and the handlers for each operation. After the process of loading the classes representing the resource descriptions and operation handlers is performed, services to be used by the hierarchically configured applications are installed. The state of each service is then determined, and one or more serialized data structures representing the state of the services is generated. Subsequently, the hierarchically configured application is launched within a second container (e.g., an execution container provided by the container application program), and the serialized data structures are used to install the services within the second container, without incurring the overhead of loading all of the classes conventionally used for service installation.

In another example, a computing system is provided. The computing system includes a first computing device comprising a first memory and a first processor device communicatively coupled to the first memory, and a second computing device comprising a second memory and a second processor device communicatively coupled to the second memory. The first computing device is to launch a hierarchically configured application within a first container of a container application platform according to one or more resource descriptions for the hierarchically configured application. The first computing device is further to determine a state of each service of one or more services initiated by the hierarchically configured application. The first computing device is also to generate one or more serialized data structures representing the state of each service of the one or more services. The second computing device is to subsequently launch the hierarchically configured application within a second container of the container application platform based on the one or more serialized data structures.

In another example, a method is provided, comprising launching a hierarchically configured application within a first container of a container application platform according to one or more resource descriptions for the hierarchically configured application. The method further comprises determining a state of each service of one or more services initiated by the hierarchically configured application. The method also comprises generating one or more serialized data structures representing the state of each service of the one or more services. The method additionally comprises subsequently launching the hierarchically configured application within a second container of the container application platform based on the one or more serialized data structures.

In another example, a computer program product stored on a non-transitory computer-readable storage medium is provided. The computer program product includes instructions to cause a processor device to launch a hierarchically configured application within a first container of a container application platform according to one or more resource descriptions for the hierarchically configured application. The instructions further cause the processor to determine a state of each service of one or more services initiated by the hierarchically configured application. The instructions also cause the processor to generate one or more serialized data structures representing the state of each service of the one or more services. The instructions additionally cause the processor to subsequently launch the hierarchically configured application within a second container of the container application platform based on the one or more serialized data structures.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
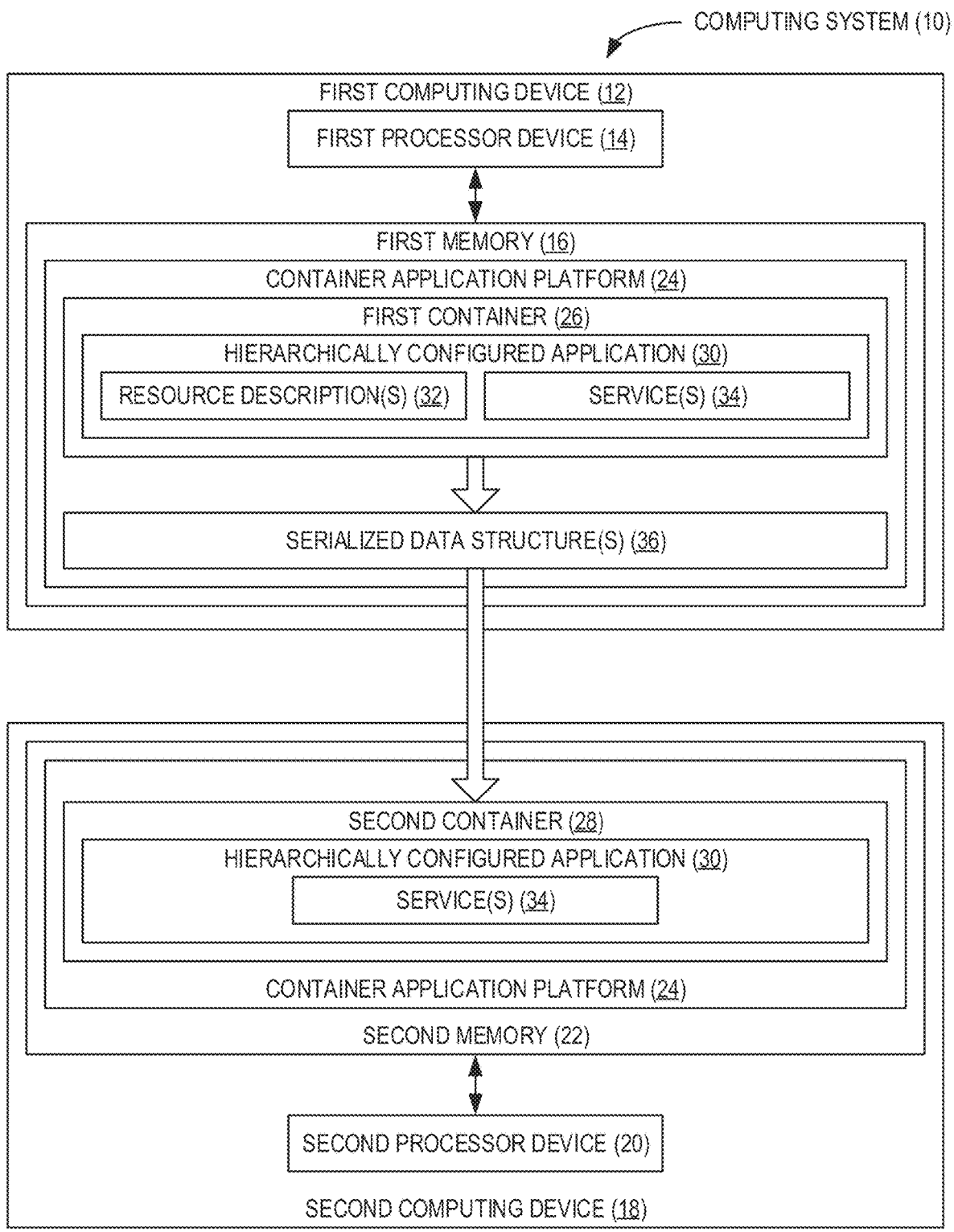
FIG. 1 is a block diagram of a computing system in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified.

Enterprise application platforms (EAPs), such as Red Hat's WildFly, provide frameworks and runtime components for developing, deploying, and hosting enterprise applications, services, and microservices. An EAP may be used to implement what is referred to herein as a "hierarchically configured application," which is an application whose structure is defined by a hierarchy of resource descriptions and operation handlers implemented as individual classes. When a hierarchically configured application is first launched, an initial set of resource descriptions are used to build a "model" of the application that defines the resources and operation handlers to be used by the application. Based on the model, a series of services, which provide the functionality of the hierarchically configured application, are then installed within the environment in which the hierarchically configured application will execute. For instance, the hierarchically configured application may be executed on dedicated hardware, or may be executed within a container provided by a container application platform such as Red Hat's OpenShift.

Each of the resource descriptions and operation handlers used to define and launch the hierarchically configured application is implemented as a separate class. Consequently, the process of launching a hierarchically configured application may involve a resource-intensive period of classloading in which instances of a substantial number of classes may be instantiated. The overhead incurred by classloading may be of particular concern for EAPs that rely on a large number of classes to implement advanced management models and application programming interfaces (APIs) (e.g., for initializing the hierarchically configured application and/or modifying the configuration of the hierarchically configured application at runtime). While such overhead may be acceptable for a hierarchically configured application that is executing on dedicated hardware, the same application executing within a container may face resource constraints that negatively affect performance. Thus, it is desirable to be able to deploy and launch a hierarchically configured application within a container with all necessary services correctly installed, while avoiding the classloading overhead incurred by conventional boot processes.

In this regard, the examples disclosed herein provide a provisioning operation to reduce the classloading required to prepare a hierarchically configured application for use within a container provided by a container application platform. As described in greater detail below, the provisioning operation involves launching the hierarchically configured application within a first container with the desired resources and deployment options, inspecting the container to determine the state of the installed services after the launch of the hierarchically configured application is complete, and then outputting one or more serialized data structures that describe the state of the installed services. A subsequent launch of the hierarchically configured application within a second container can then be performed using the one or more serialized data structures to install the necessary services.

FIG. 1 illustrates a computing system 10 in which examples may be practiced. In the computing system 10, a first computing device 12 includes a first processor device 14 that is communicatively coupled to a first memory 16, while a second computing device 18 includes a second processor device 20 that is communicatively coupled to a second memory 22. The first memory 16 and the second memory 22 each may comprise a random access memory (RAM) such as a dynamic random access memory (DRAM), as a non-limiting example. To provide container-based deployment and execution of applications (e.g., in a cloud environment), each of the first computing device 12 and the second computing device 18 provides an instance of a container application platform 24. The container application platform 24 provides operating-system-level virtualization functionality for deploying and executing distributed applications, and may comprise, as a non-limiting example, Red Hat's OpenShift container application platform.

The container application platform 24 in the example of FIG. 1 provides a first container 26 (i.e., a provisioning container, in some examples) and a second container 28 (i.e., an execution container, according to some examples). Each of the first container 26 and the second container 28 represents an isolated system that makes a predefined set of resources (e.g., memory, non-volatile storage, and the like) available for use by applications executing therein. Although not illustrated in FIG. 1, it is to be understood that both the first container 26 and the second container 28 may be initiated within the same instance of the container application platform 24, instead of within different instances of the container application platform 24 as shown in FIG. 1.

In the example of FIG. 1, the first container 26 is used to carry out a provisioning operation in which a hierarchically configured application 30 is launched according to one or more resource descriptions 32. The one or more resource descriptions 32 describe a valid hierarchical structure for the hierarchically configured application 30, and further define valid operations at each hierarchical level as well as operation handlers (not shown) for each operation. The resource descriptions 32 and the associated operation handlers are implemented as individual classes, instances of which are used to define the structure of the hierarchically configured application 30.

During the initial provisioning operation, the hierarchically configured application 30 is launched by the first computing device 12 in a conventional manner while being monitored by the first container 26 of the container application platform 24. In some examples, launching the hierarchically configured application 30 may involve performing a number of management operations to add resources to a resource "model" representing the structure of the hierarchically configured application 30. "Extensions" that provide additional functionality (such as support for logging, web server functions, Enterprise Java Bean (EJB) containers, transactions, and the like) for the hierarchically configured application 30 may also be added to the resource model. Each resource and extension may in turn add subclasses and subsystems to the resource model as needed. After the resource model is complete, a runtime handler for each resource is invoked to instantiate all necessary classes and install one or more services 34. The one or more services 34 provide the actual functionality required by the hierarchically configured application 30, with the values and dependencies for the services 34 being determined by inspecting the resource model.

Once the hierarchically configured application 30 has been launched within the first container 26, the first container 26 inspects the one or more services 34 to determine a state of the one or more services 34. This may include, as non-limiting examples, identifying injection points for each of the one or more services 34, identifying dependencies for each of the one or more services 34, and/or obtaining references to the actual instances of the one or more services 34. Data representing the state of the one or more services 34 is then used to generate one or more serialized data structures 36, representing a snapshot of the one or more services 34 within the first container 26 as well as data necessary to recreate the state of the hierarchically configured application 30 as it exists after launch within the first container 26.

Upon a subsequent launch of the hierarchically configured application 30 within the second container 28 of the second computing device 18, the conventional building of the resource model and execution of operations to install the one or more services 34 is not performed. Instead, the one or more serialized data structures 36 are used to identify and install the necessary one or more services 34. In this manner, the overhead incurred by loading conventional resource definition, operation handler, and/or deployment classes is avoided while still providing the full functionality of the hierarchically configured application 30.

It is to be understood that, because the container application platform 24 is an element of the first computing device 12 and the second computing device 18, functionality implemented by the container application platform 24 may be generally attributed herein to the first computing device 12 and/or to the second computing device 18. Moreover, it is to be further understood that, in examples where the container application platform 24 comprises software instructions that program the first processor device 14 and/or the second processor device 20 to carry out functionality discussed herein, functionality implemented by the container application platform 24 may be attributed herein to the first processor device 14 and/or the second processor device 20.

Figure 2:
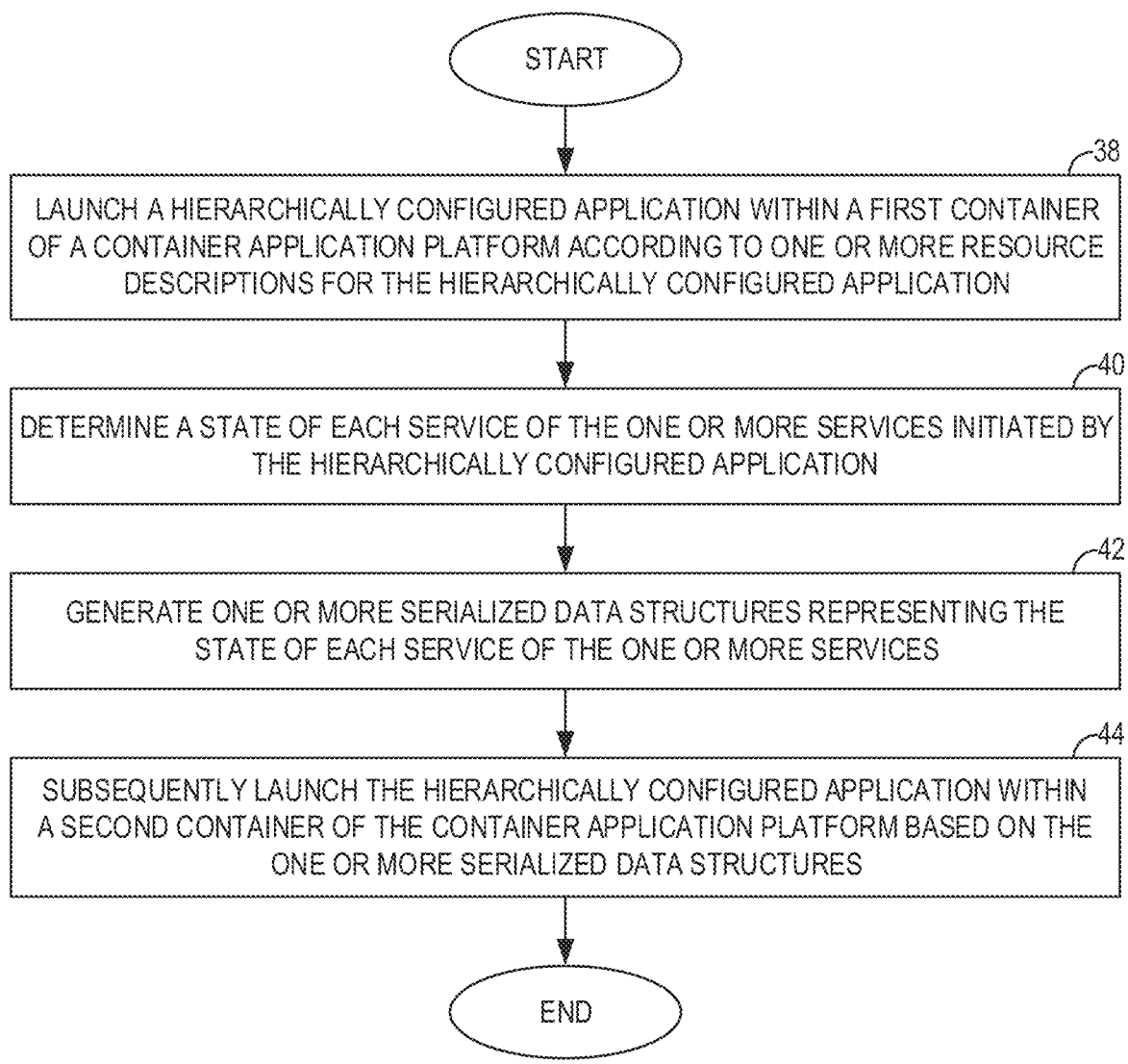
FIG. 2 is a flowchart of a method for reducing classloading of hierarchically configured applications via provisioning, according to one example.

To illustrate a method for reducing classloading of hierarchically configured applications via provisioning according to one example, FIG. 2 is provided. For the sake of clarity, elements of FIG. 1 are referenced in describing FIG. 2. In FIG. 2, operations begin with the container application platform 24 of FIG. 1 launching the hierarchically configured application 30 within the first container 26 of the container application platform 24 according to one or more resource descriptions 32 for the hierarchically configured application 30 (block 38). The first container 26 then determines a state of each service of the one or more services 34 initiated by the hierarchically configured application 30 (block 40). The first container 26 generates one or more serialized data structures 36 representing the state of each service of the one or more services 34 (block 42). The container application platform 24 subsequently launches the hierarchically configured application 30 within a second container 28 of the container application platform 24 based on the one or more serialized data structures 36 (block 44).

Figure 3:
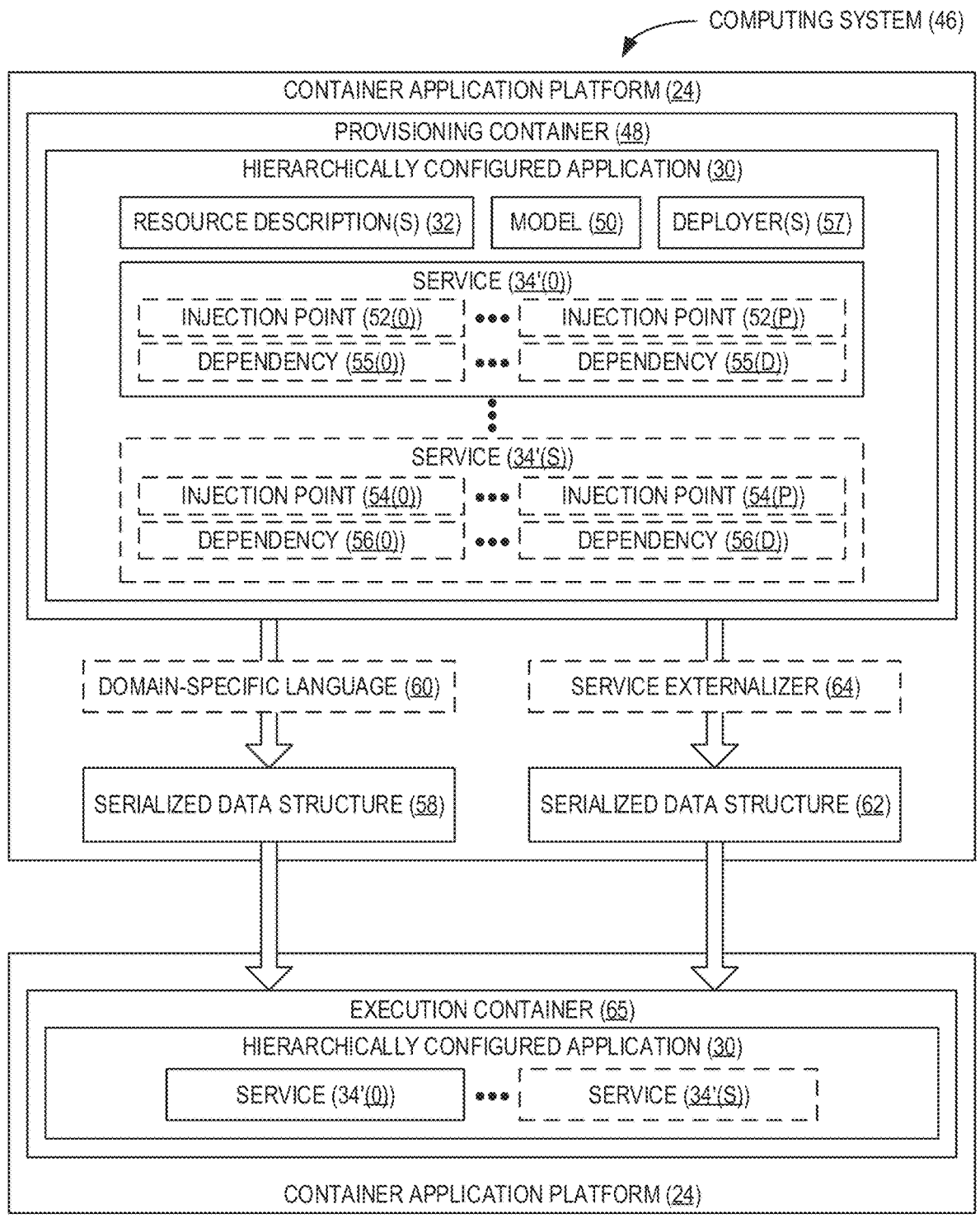
FIG. 3 is a more detailed block diagram of a computing system according to one example, in which a provisioning operation may be performed on a hierarchically configured application to generate serialized data structures that enable the hierarchically configured application to be subsequently launched with reduced classloading.

FIG. 3 illustrates another example of a computing system 46 that includes additional elements and interactions that may be used to reduce classloading overhead. In FIG. 3, the computing system 46 includes two (2) instances of the container application platform 24 of FIG. 1. One instance of the container application platform 24 provides a provisioning container 48, which corresponds in functionality to the first container 26 of FIG. 1. To perform the provisioning operation, the hierarchically configured application 30 is first launched by the container application platform 24 within the provisioning container 48 according to the one or more resource descriptions 32 of FIG. 1, as described above. The one or more resource descriptions 32 are used to build a model 50 that represents the structure of the hierarchically configured application 30, and that is used to determine the values and dependencies for the services 34'(0)-34'(S). Extensions (not shown) for providing additional functionality for the hierarchically configured application 30 may also be added to the model 50, and in turn may add additional subclasses and subsystems to the model 50 as needed. After the model 50 is complete, a runtime handler for each of the one or more resource descriptions 32 is invoked to instantiate all necessary classes and install one or more services 34'(0)-34'(S) (corresponding to the one or more services 34 of FIG. 1). Each service 34'(0)-34'(S) is associated with one or more respective injection points 52(0)-52(P), 54(0)-54(P) and/or one or more respective dependencies 55(0)-55(D), 56 (0)-56(D).

The hierarchically configured application 30 in the example of FIG. 3 further provides one or more deployers 57, which may be employed to distribute a "deployment" of the hierarchically configured application 30. The deployer(s) 57 are implemented as a series of instances of classes (e.g., that implement the DeploymentUnitProcessor interface of WildFly). The deployer(s) 57 may constitute a chain of deployment unit processors that determine the services 34'(0)-34'(S) that should be installed to provide the functionality for the hierarchically configured application 30. At the end of the chain, the services 34'(0)-34'(S) are installed using values and dependencies determined from the deployment itself by the deployment unit processors.

In the example of FIG. 3, the provisioning container 48 determines the state of each of the services 34'(0)-34'(S) by identifying each injection point 52(0)-52(P), 54(0)-54(P) for the services 34'(0)-34'(S), and further by identifying each dependency 55(0)-55(D), 56(0)-56(D) for the services 34' (0)-34'(S). The data identifying each injection point 52(0)-52(P), 54(0)-54(P) and each dependency 55(0)-55(D),

56(0)-56(D) for the services 34'(0)-34'(S) is then serialized into a serialized data structure 58. According to some examples, the serialization may be accomplished using a domain-specific language 60.

As part of the provisioning operation, the provisioning container 48 may also identify and obtain a reference (not shown) to each instance of the services 34'(0)-34'(S) that were installed during launch of the hierarchically configured application 30. The references to the services 34'(0)-34'(S) may then be serialized into a serialized data structure 62. In some examples, serialization of the references to the services 34'(0)-34'(S) may be accomplished through the user of a service externalizer 64.

The serialized data structures 58, 62 of FIG. 3 may be used to subsequently launch the hierarchically configured application 30 within an execution container 65 (corresponding to the second container 28 of FIG. 1) of the container application platform 24. The execution container 65 may be based on a conventional container of the container application platform 24. In some examples, the container application platform 24 launches the hierarchically configured application 30 by first deserializing each instance of the services 34'(0)-34'(S) from the serialized data structure 62. The container application platform 24 then determines, based on the serialized data structure 58, whether any dependencies 55(0)-55(D), 56(0)-56(D) exist for the services 34'(0)-34'(S), and, if so, sets the one or more dependencies 55(0)-55(D), 56(0)-56(D). The container application platform 24 next installs the hierarchically configured application 30 into the execution container 65, and finally executes the hierarchically configured application 30 within the execution container 65.

Figure 4:
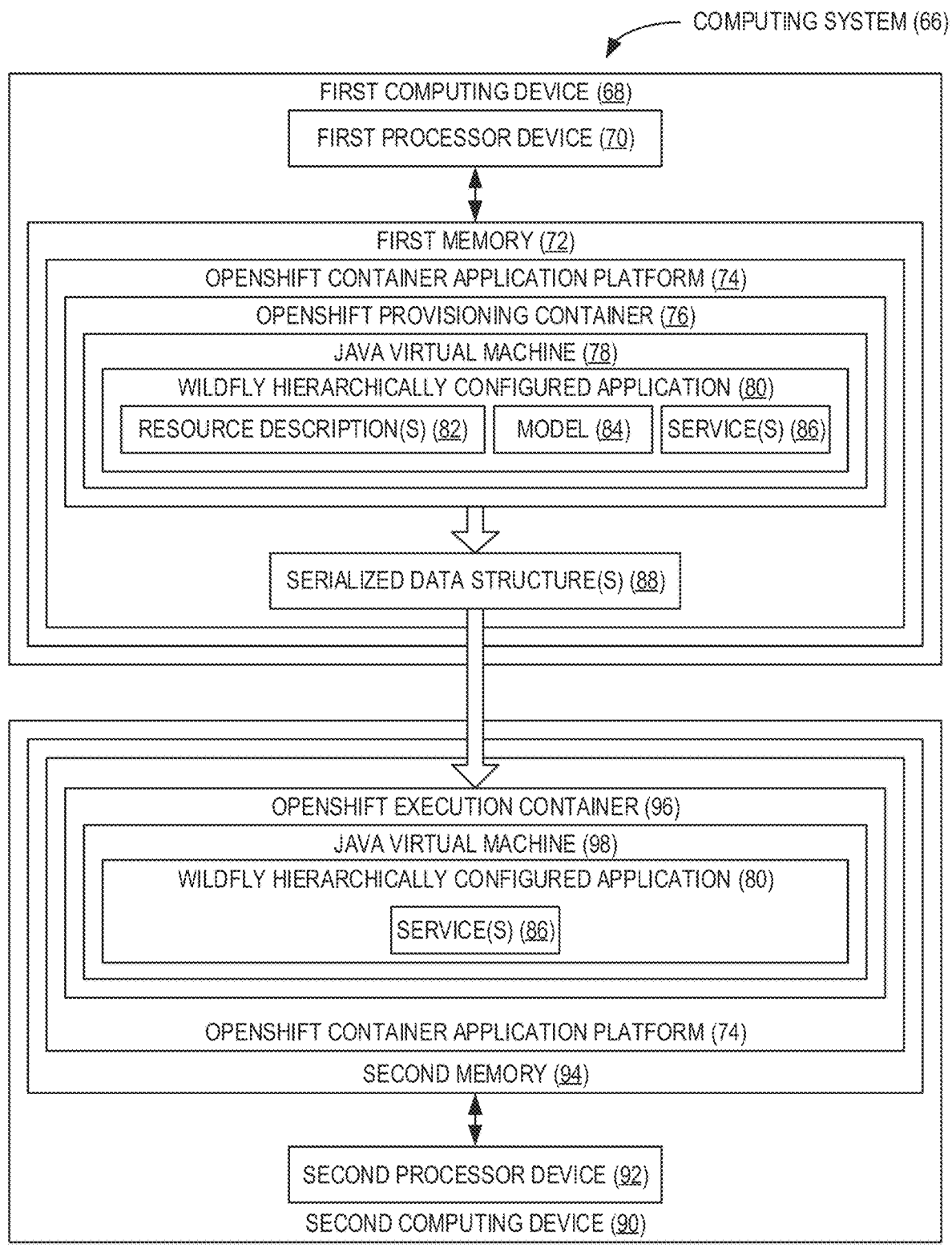
FIG. 4 is a block diagram of a computing system for performing a provisioning operation to generate serialized data structures using the RedHat OpenShift container application platform and the RedHat WildFly application server, according to one example.

FIG. 4 illustrates another example of a computing system 66 for reducing classloading of hierarchically configured applications via provisioning. The computing system 66 includes a first computing device 68 that comprises a first processor device 70 coupled to a first memory 72. The first computing device 68 executes an instance of a Red Hat OpenShift container application platform 74, which provides an OpenShift provisioning container 76. A Java virtual machine 78 executes within the OpenShift provisioning container 76, and provides an execution environment in which a provisioning operation may be performed on a Red Hat WildFly hierarchically configured application 80.

To perform the provisioning operation, the OpenShift provisioning container 76 launches the WildFly hierarchically configured application 80 according to one or more resource descriptions 82, and generates a model 84 as described above with respect to FIGS. 1 and 3. After the model 84 is complete, a runtime handler for each of the one or more resource descriptions 82 is invoked to instantiate all necessary classes and install one or more services 86, which provide the functionality of the WildFly hierarchically configured application 80.

After the WildFly hierarchically configured application 80 has been launched within the OpenShift provisioning container 76, the one or more services 86 are inspected by the OpenShift provisioning container 76 to determine a state of the one or more services 86. Data representing the state of the one or more services 86 is then used to generate one or more serialized data structures 88, representing a snapshot of the one or more services 86 within the OpenShift provisioning container 76, as well as data necessary to recreate the state of the WildFly hierarchically configured application 80 as it exists after launch within the OpenShift provisioning container 76.

The computing system 66 of FIG. 4 further includes a second computing device 90 comprising a second processor device 92 communicatively coupled to a second memory 94. The second computing device 90 executes a second instance of the OpenShift container application platform 74, which provides an OpenShift execution container 96 containing a Java virtual machine 98. Upon a subsequent launch of the WildFly hierarchically configured application 80 within the Java virtual machine 98 of the OpenShift execution container 96, the one or more serialized data structures 88 generated by the provisioning operation are used to identify and install the necessary one or more services 86 without incurring the overhead of classloading associated with the conventional process for launching the WildFly hierarchically configured application 80.

Figure 5A:
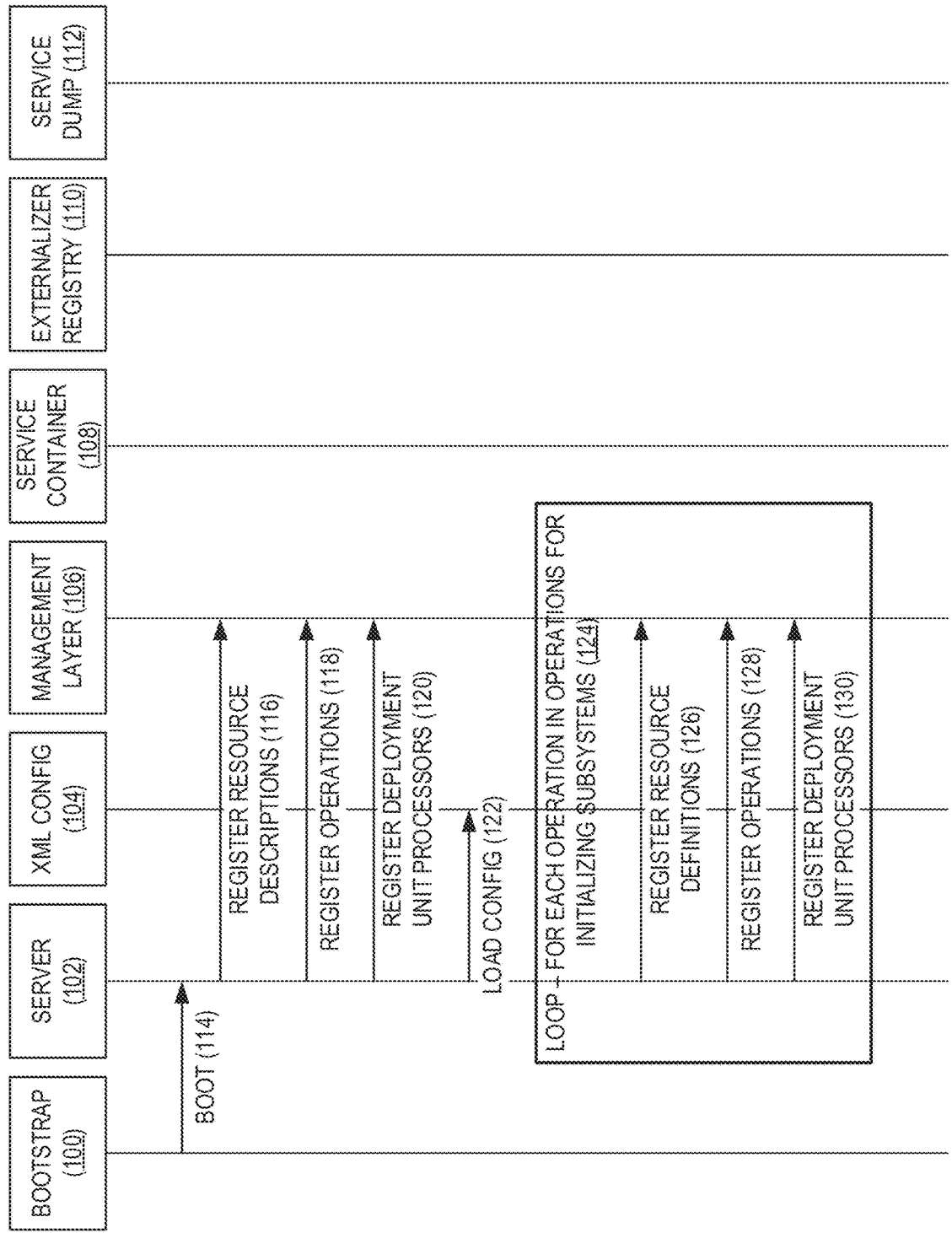
FIGS. 5A-5E are messaging diagrams illustrating communications flows among elements of the RedHat WildFly application server of FIG. 4 for performing a provisioning operation and a subsequent launch of a WildFly hierarchically configured application.
Figure 5B:
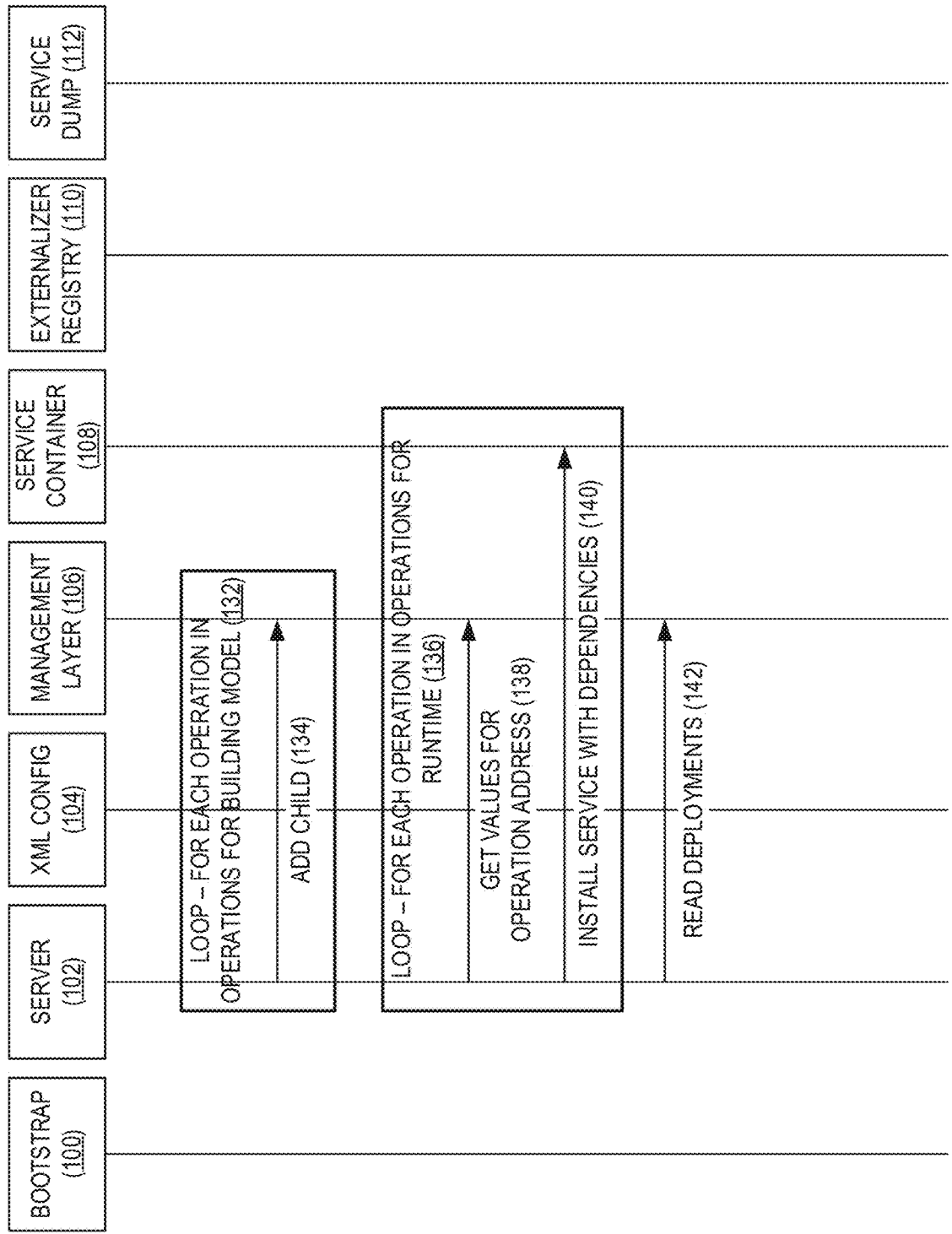
Figure 5C:
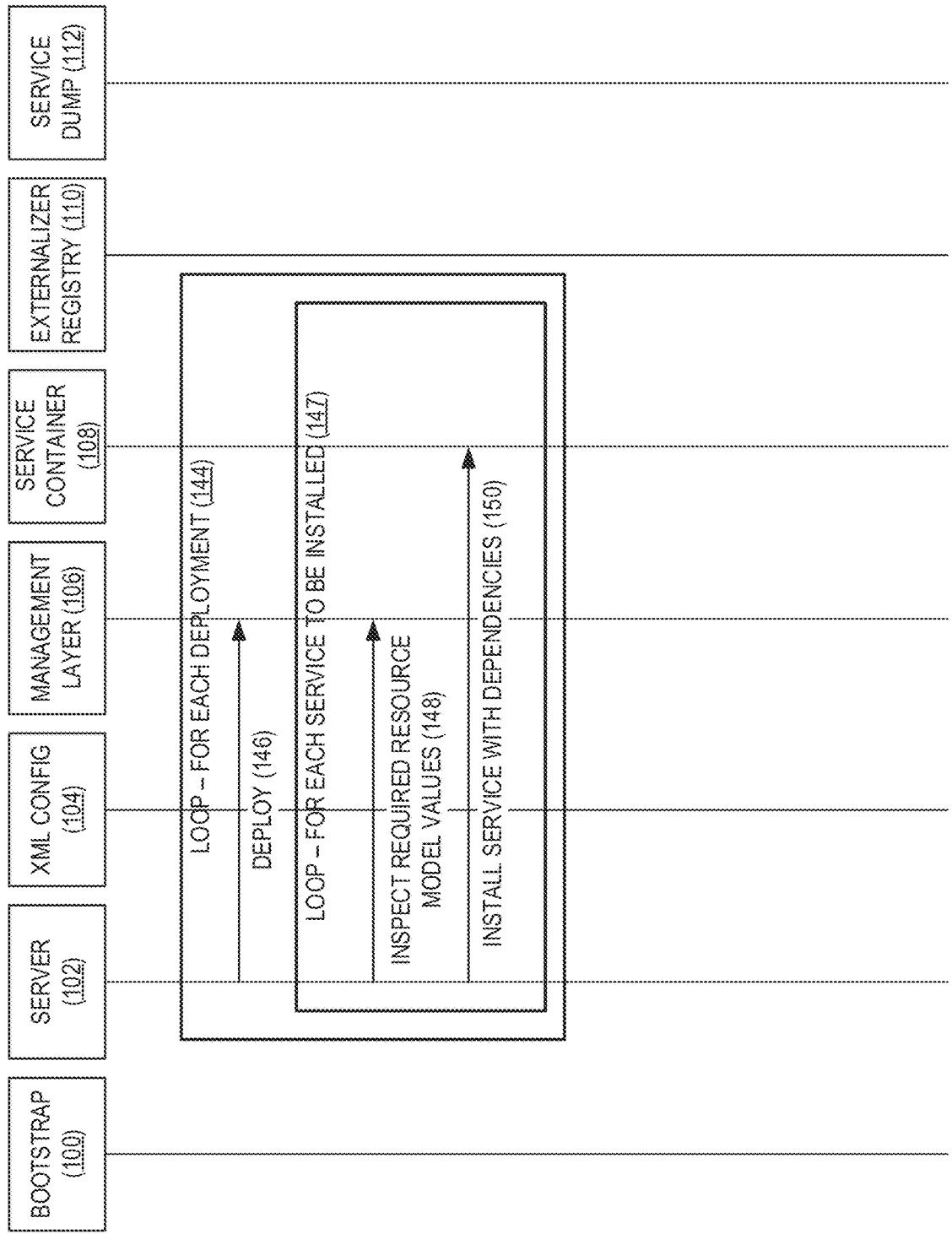
Figure 5D:
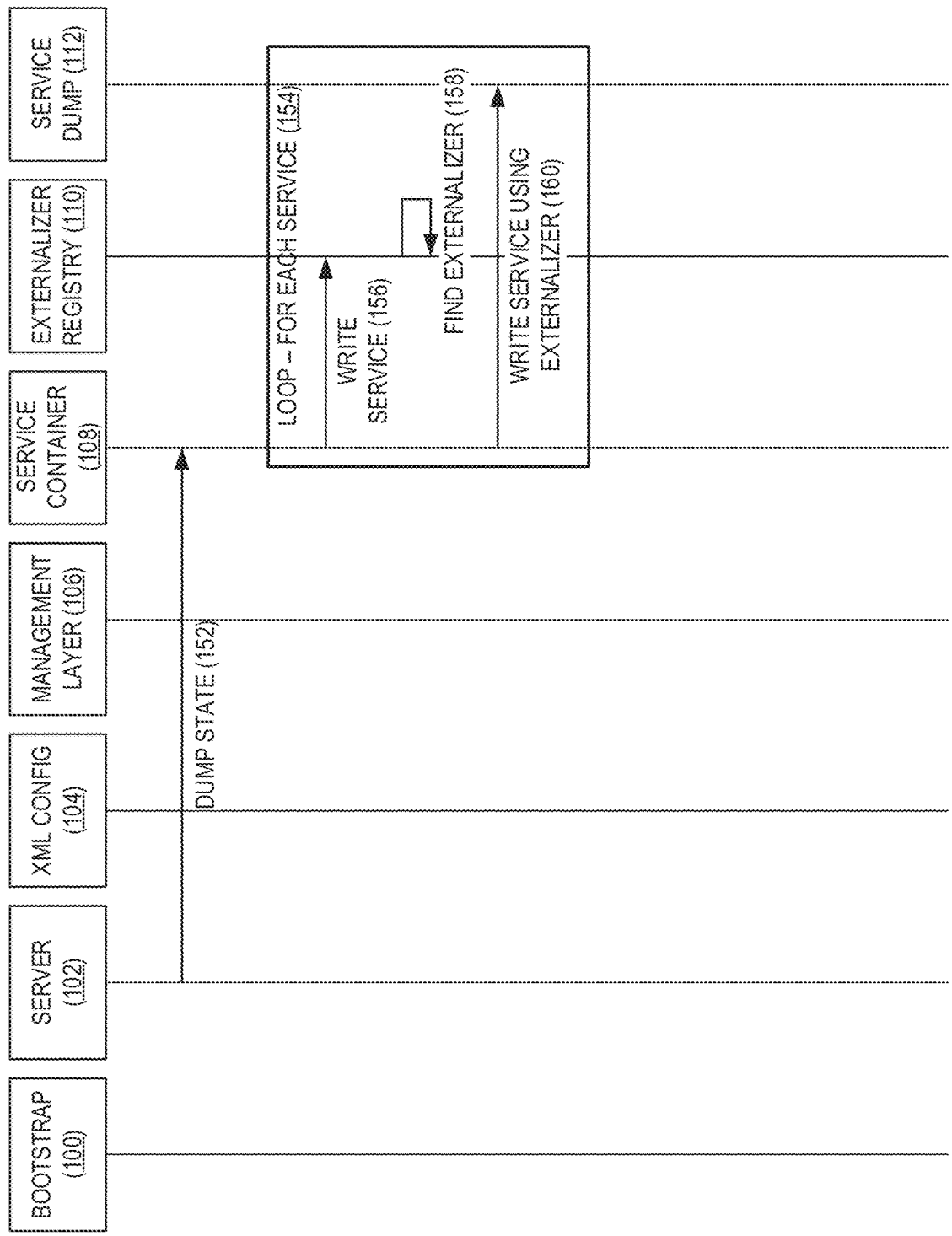
Figure 5E:
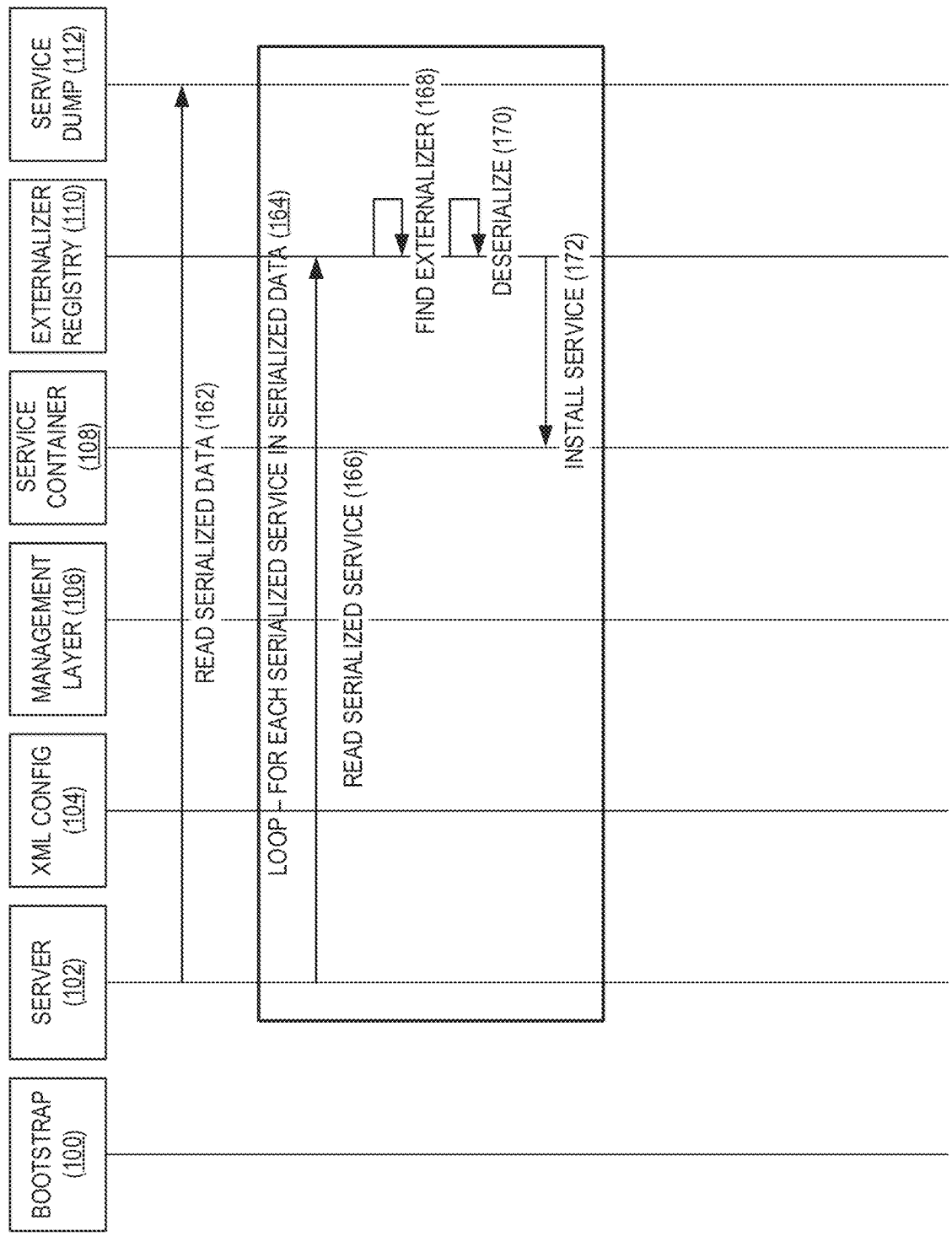

To illustrate communications flows among elements of the WildFly hierarchically configured application 80 of FIG. 4 while performing the provisioning operation and subsequent launch of the WildFly hierarchically configured application 80, FIGS. 5A-5E are provided. FIGS. 5A-5C illustrate communications associated with a conventional launch of the WildFly hierarchically configured application 80, while FIG. 5D illustrates communications involved with generating the one or more serialized data structures 88. FIG. 5E illustrates communications involved with subsequently launching the WildFly hierarchically configured application 80 using the one or more serialized data structures 88.

In FIGS. 5A-5C, communications take place among elements provided by the WildFly hierarchically configured application 80 and its associated framework, including a bootstrap 100, a server 102, an extensible markup language (XML) configuration ("XML CONFIG") 104, a management layer 106, a service container 108, an externalizer registry 110, and a service dump 112. The bootstrap 100 represents the components and processes for initiating a launch of the WildFly hierarchically configured application 80 of FIG. 4, while the server 102 represents functionality for instantiating services (such as the one or more services 86 of FIG. 4) comprising the WildFly hierarchically configured application 80. The XML configuration 104 represents resources and extensions to be added to a model (such as the model 84 of FIG. 4), which is constructed using functionality provided by the management layer 106. The service container 108 provides a wrapper for instances of each service, which may be serialized using externalizers (specified by the externalizer registry 110) into the service dump 112 (e.g., the one or more serialized data structures 88 of FIG. 4).

Operations begin in FIG. 5A with the bootstrap 100 initiating a boot of the server 102 (indicated by element 114) to the server 102. In response, the server 102 sends instructions to the management layer 106 to register resource descriptions, register operations, and register deployment unit processors (indicated by elements 116, 118, and 120, respectively). The server 102 then accesses the XML configuration 104 to load application configuration data (indicated by element 122), which begins a process for adding resources to the model. In particular, the server 102 enters a loop (indicated by element 124) in which operations are performed to initialize each subsystem specified by the XML configuration 104. Thus, for each initialization operation, the server 102 sends instructions to the management layer 106 to register resource descriptions, register operations, and register deployment unit processors (indicated by elements 126, 128, and 130, respectively). Processing then resumes in FIG. 5B.

Referring now to FIG. 5B, the server 102 continues building the model by performing a loop (indicated by element 132) in which the server 102 instructs the management layer 106 to execute an add child operation (indicated by element 134) for each subsystem to be added to the model 84. Next, the server 102 carries out operations for the "runtime" phase of launch by performing a loop (indicated by element 136) for each runtime handler that was previously added to the model 84. For each runtime handler, the server 102 gets values for the address of each operation to be carried out (indicated by element 138) from the management layer 106, and installs the corresponding service (e.g., one of the one or more services) 86 with its dependencies (indicated by element 140) into the service container 108. Once the runtime phase is complete, the "deployment" stage begins with the server 102 reading deployments (indicated by element 142) from the management layer 106. Processing then continues in FIG. 5C.

The deployment phase continues in FIG. 5C, where the server 102 performs a loop for each deployment (indicated by element 144). The server 102 first sends a deploy instruction (indicated by element 146) to the management layer 106. Subsequently, the server 102 performs a loop (indicated by element 147) in which each deployment is inspected by passing it through a chain of registered deployment unit processors (not shown) to inspect the required resource model values (indicated by element 148) and determine the resulting services that should be installed to provide the functionality for the end user's application. The services are then installed (indicated by element 150) using values and dependencies determined from the deployment itself by the deployment unit processors. Values and dependencies for the services are determined by inspecting the resource model. Processing then continues in FIG. 5D.

Turning now to FIG. 5D, the provisioning operation begins with the server 102 issuing an instruction to dump a state (indicated by element 152) to the service container 108. In response, the service container 108 performs a loop (indicated by element 154) for each service to be serialized. First, the service container 108 issues a write service instruction (indicated by element 156) to the externalizer registry 110. The externalizer registry 110 then finds an appropriate externalizer for the indicated service (indicated by element 158). The service container 108 then uses the appropriate externalizer to write the service to the service dump 112 (indicated by element 160). Processing then resumes in FIG. 5E.

In FIG. 5E, a subsequent launch of the WildFly hierarchically configured application 80 begins with the server 102 reading serialized data (e.g., from the one or more serialized data structures 88 of FIG. 4) from the service dump 112 (indicated by element 162). The server 102 then performs a loop for each serialized service in the serialized data (indicated by element 164). For each serialized service, the server 102 instructs the externalizer registry 110 to read the serialized service (indicated by element 166). The externalizer registry 110 locates the appropriate externalizer (indicated by element 168), and deserializes the serialized service (indicated by element 170). The deserialized service is then installed in the service container 108 (indicated by element 172).

To illustrate additional operations according to one example for reducing classloading of the hierarchically configured application 30 of FIG. 1, FIGS. 6A-6C are provided. Elements of FIGS. 1-3 are referenced in describing FIGS. 6A-6C, for the sake of clarity. Operations in FIG. 6A begin with the container application platform 24 of FIG. 1 launching the hierarchically configured application 30 within the first container 26 of the container application platform 24 according to the one or more resource descriptions 32 for the hierarchically configured application 30 (block 174). The first container 26 then determines a state of each service 34' of the one or more services 34'(0)-34'(S) initiated by the hierarchically configured application 30 (block 176). In some examples, the operations of block 176 for determining the state of each service 34'(0)-34'(S) initiated by the hierarchically configured application 30 may include the first container 26 first identifying an injection point 52(0)-52(P), 54(0)-54(P) for each service 34' of the one or more services 34'(0)-34'(S) (block 178). The first container 26 identifies one or more dependencies 55(0)-55(D), 56(0)-56(D) for each service 34' of the one or more services 34 (block 180). The first container 26 then obtains a reference to each instance of each service 34' of the one or more services 34'(0)-34'(S) (block 182). Processing then resumes at block 184 of FIG. 6B.

Figure 6A:
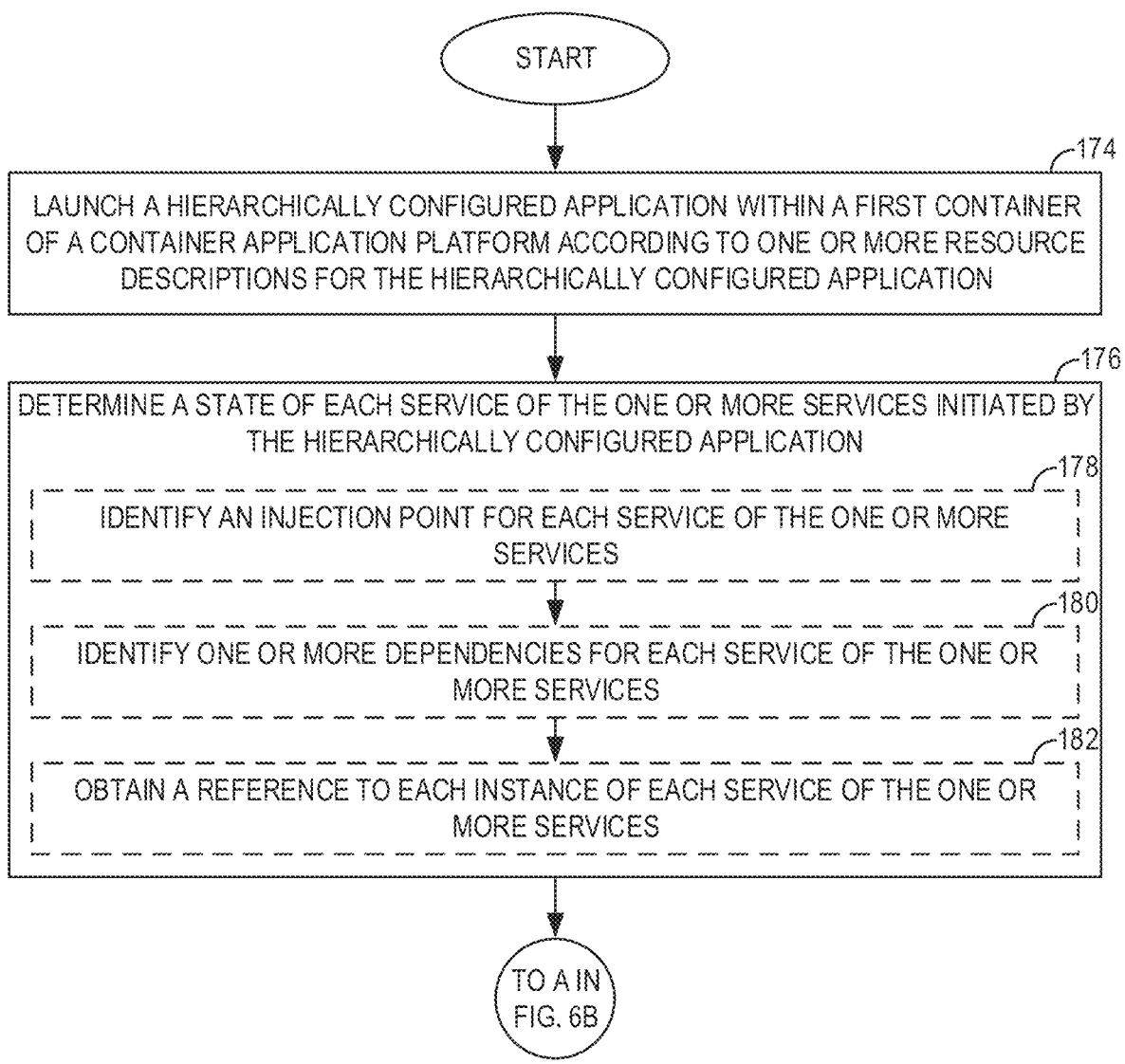
FIGS. 6A-6C are flowcharts illustrating additional operations according to one example for performing a provisioning operation and subsequently launching a hierarchically configured application.
Figure 6B:
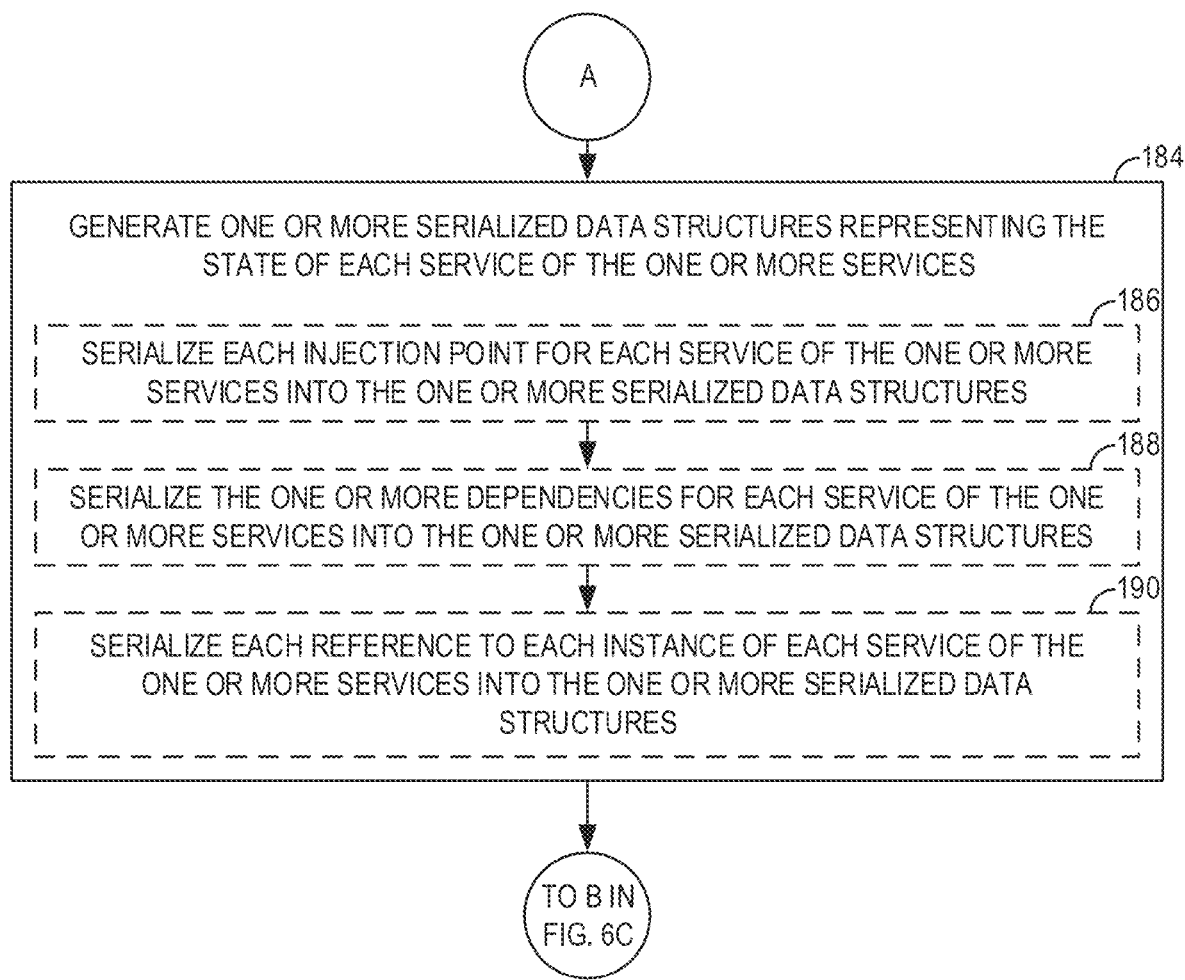

Referring now to FIG. 6B, the first container 26 next generates one or more serialized data structures 58, 62 representing the state of each service 34' of the one or more services 34'(0)-34'(S) (block 184). According to some examples, the operations of block 184 for generating the one or more serialized data structures 58, 62 may include the first container 26 serializing each injection point 52(0)-52(P), 54(0)-54(P) for each service 34' of the one or more services 34'(0)-34'(S) into the one or more serialized data structures 58, 62 (block 186). The first container 26 also serializes the one or more dependencies 55(0)-55(D), 56(0)-56(D) for each service 34' of the one or more services 34'(0)-34'(S) into the one or more serialized data structures 58, 62 (block 188). The first container 26 serializes each reference to each instance of each service 34' of the one or more services 34'(0)-34'(S) into the one or more serialized data structures 58, 62 (block 190). Processing then resumes at block 192 of FIG. 6C.

Figure 6C:
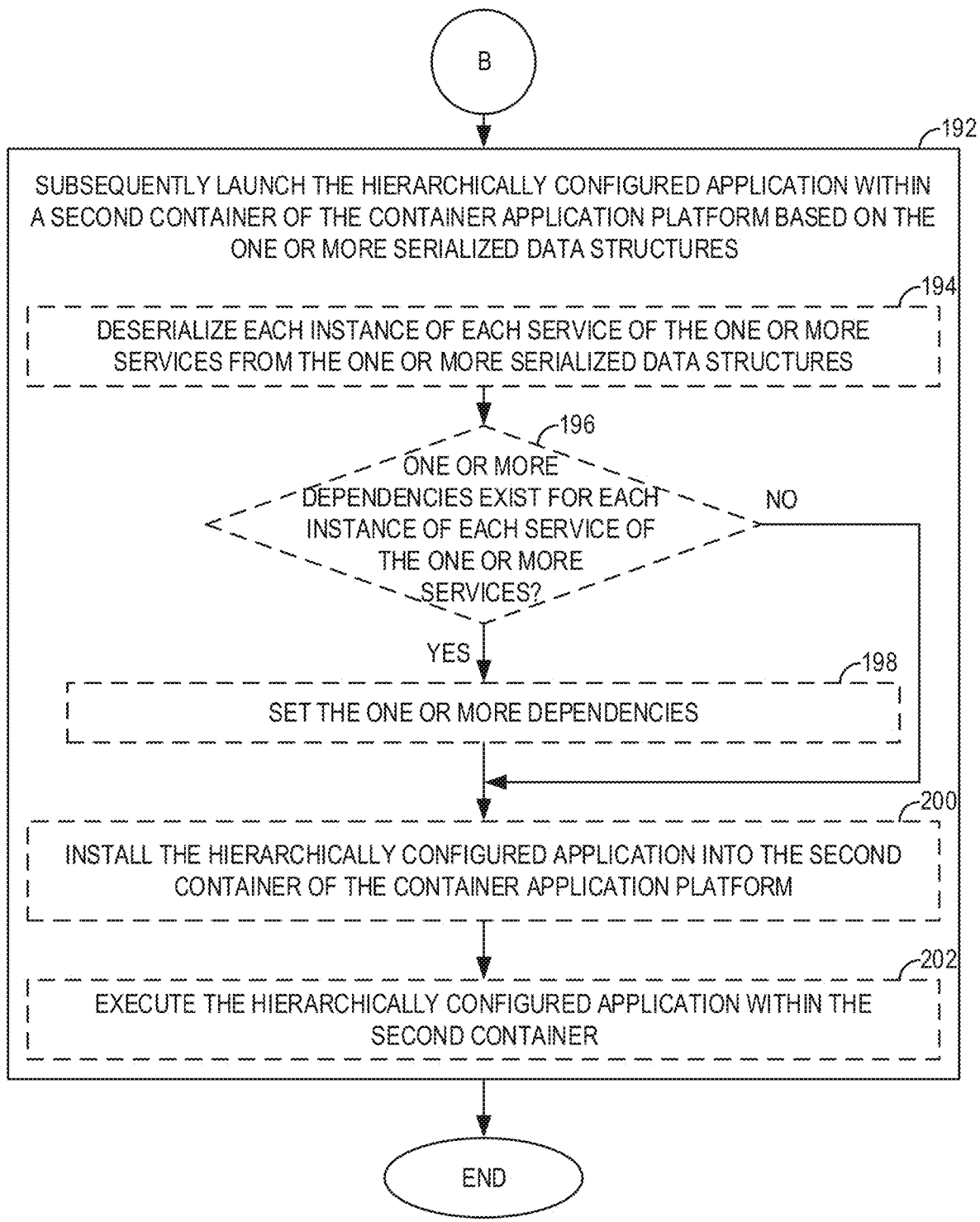

Turning now to FIG. 6C, the container application platform 24 subsequently launches the hierarchically configured application 30 within a second container 28 of the container application platform 24 based on the one or more serialized data structures 58, 62 (block 192). Some examples may provide that the operations of block 192 for subsequently launching the hierarchically configured application 30 based on the one or more serialized data structures 58, 62 may include first deserializing each instance of each service 34' of the one or more services 34'(0)-34'(S) from the one or more serialized data structures 58, 62 (block 194). The container application platform 24 at this point may determine whether one or more dependencies 55(0)-55(D), 56(0)-56(D) exist for each instance of each service 34' of the one or more services 34'(0)-34'(S) (block 196). If not, processing continues at block 198 of FIG. 6C. If the container application platform 24 determines at decision block 196 that one or more dependencies 55(0)-55(D), 56(0)-56(D) do exist, the container application platform 24 may set the one or more dependencies 55(0)-55(D), 56(0)-56(D) (block 200). Processing then resumes at block 198.

The container application platform 24 then installs the hierarchically configured application 30 into the second container 28 of the container application platform 24 (block 198). Finally, the container application platform 24 executes the hierarchically configured application 30 within the second container 28 (block 202).

Figure 7:
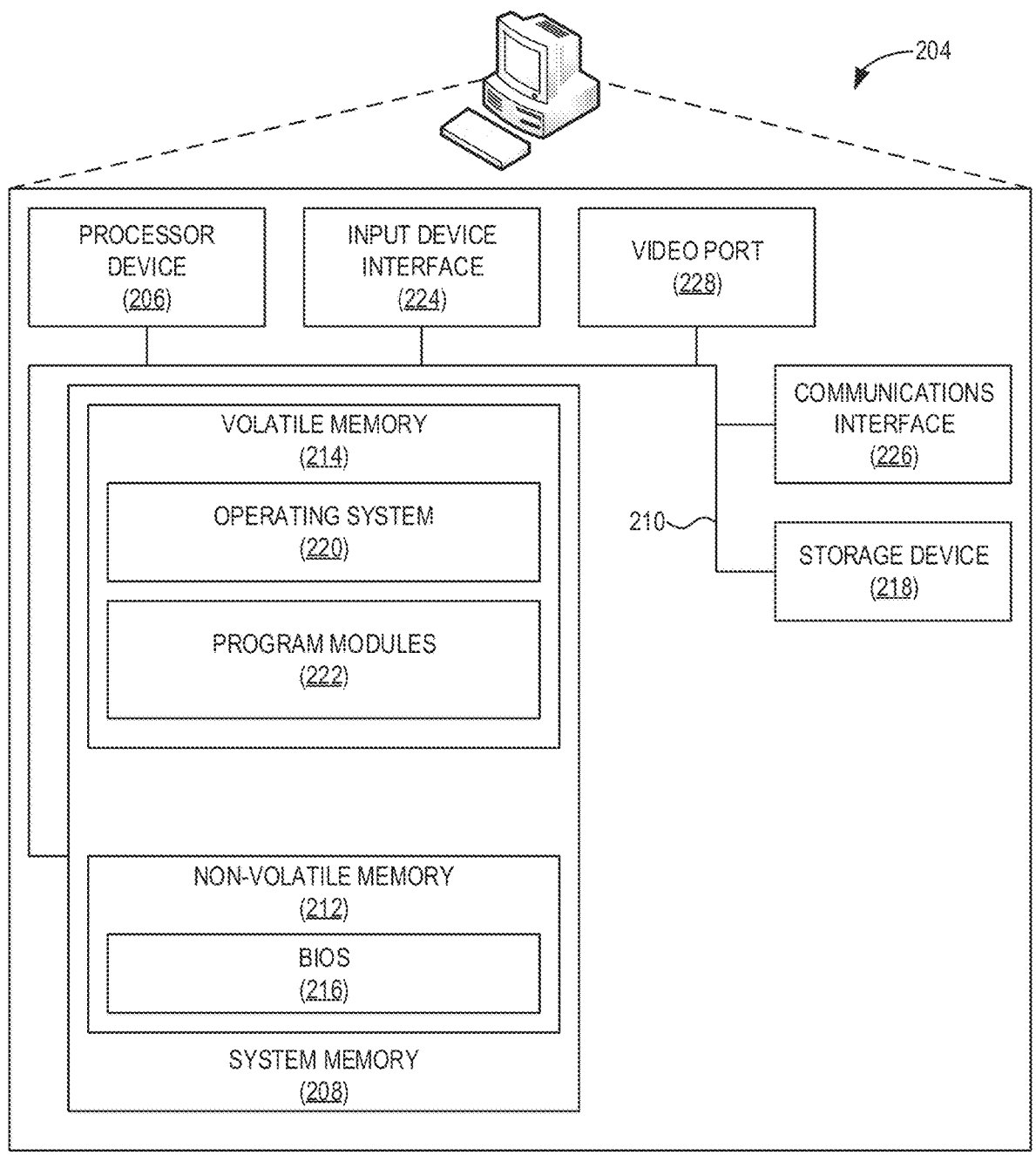
FIG. 7 is a block diagram of a computing device suitable for implementing examples according to one example.

FIG. 7 is a block diagram of a processor-based computing device 204 ("computing device 204"), such as the first computing device 12 or the second computing device 18 of FIG. 1, suitable for implementing examples according to one example. The computing device 204 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 204 includes a processor device 206, a system memory 208, and a system bus 210. The system bus 210 provides an interface for system components including, but not limited to, the system memory 208 and the processor device 206. The processor device 206 can be any commercially available or proprietary processor.

The system bus 210 may be any of several types of bus structures that may further interconnect to a memory bus (with or without a memory controller), a peripheral bus, and/or a local bus using any of a variety of commercially available bus architectures. The system memory 208 may include non-volatile memory 212 (e.g., read-only memory (ROM), erasable ROM (EPROM), electrically EPROM (EEPROM), etc.), and volatile memory 214 (e.g., RAM). A basic input/output system (BIOS) 216 may be stored in the non-volatile memory 212 and can include the basic routines that help to transfer information among elements within the computing device 204. The volatile memory 214 may also include a high-speed RAM, such as static RAM, for caching data.

The computing device 204 may further include or be coupled to a non-transitory computer-readable storage medium such as a storage device 218, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 218 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 218 and in the volatile memory 214, including an operating system 220 and one or more program modules 222 which may implement the functionality described herein in whole or in part. It is to be appreciated that the examples can be implemented with various commercially available operating systems 220 or combinations of operating systems 220.

A number of modules can be stored in the storage device 218 and in the volatile memory 214. All or a portion of the examples may be implemented as a computer program product stored on a transitory or non-transitory computer-usable or computer-readable storage medium, such as the storage device 218, which includes complex programming instructions, such as complex computer-readable program code, to cause the processor device 206 to carry out the steps described herein. Thus, the computer-readable program code can comprise software instructions for implementing the functionality of the examples described herein when executed on the processor device 206. The processor device 206 may serve as a controller, or control system, for the computing device 204 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 206 through an input device interface 224 that is coupled to the system bus 210 but can be connected by other interfaces, such as a parallel port, an Institute of Electrical and Electronic Engineers (IEEE) 1394 serial port, a Universal Serial Bus (USB) port, an IR interface, and the like.

The computing device 204 may also include a communications interface 226 suitable for communicating with a network as appropriate or desired. The computing device 204 may also include a video port 228 to interface with a display device to provide information to a user.

Figure 8:
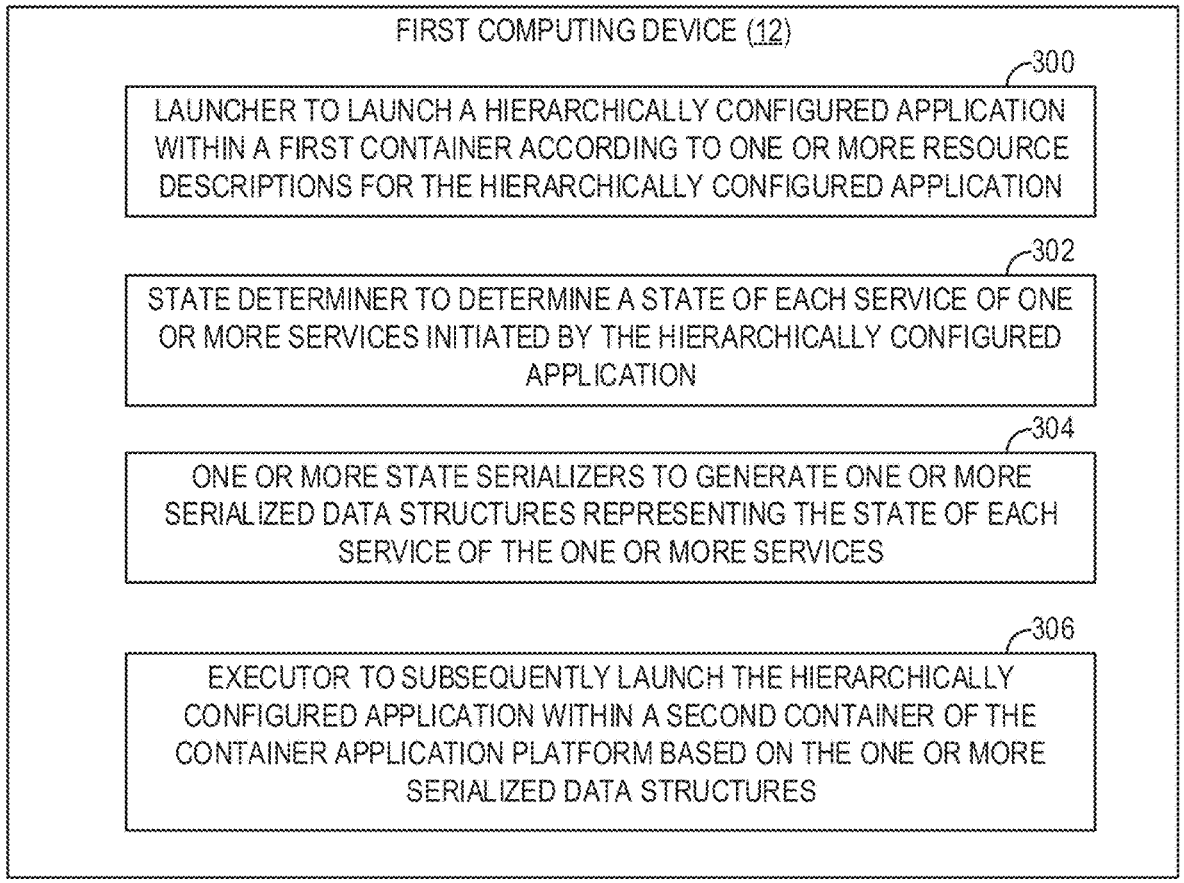
FIG. 8 is a block diagram of a computing device suitable for implementing examples according to another example.

FIG. 8 is a block diagram of a computing device suitable for implementing examples according to another example. In this example, the computing device 12 includes a launcher 300 to launch the hierarchically configured application 30 within the first container 26 according to one or more resource descriptions 32 for the hierarchically configured application 30. In some examples, the hierarchically configured application 30 may be configured to be launched, or executed, in one of two modes. One mode is a model mode in which, when launched in the model mode, the hierarchically configured application 30 builds up the model 50, as described above. The launcher 300 launches the hierarchically configured application 30 in the model mode.

The first computing device 12 includes a state determiner 302 to determine a state of each service 34 of the one or more services 34 initiated by the hierarchically configured application 30. The first computing device 12 includes one or more state serializers 304 to generate the one or more serialized data structures 58, 62 representing the state of each service 34 of the one or more services 34. The first computing device 12 includes an executor 306 to subsequently launch the hierarchically configured application 30 within the second container 28 of the container application platform 24 based on the one or more serialized data structures 58, 62. The executor 306 may launch the hierarchically configured application 30 in a light mode rather than the model mode. When launched in the light mode, the hierarchically configured application 30 does not build up the model 50. Instead, the hierarchically configured application 30 uses the serialized data structures 58, 62 to initialize the services 34, to eliminate the memory and processor utilization associated with the instantiation of multiple classes that would otherwise occur.

In one example, the state determiner 302 is to determine the state of each service 34 of the one or more services 34 initiated by the hierarchically configured application 30 by identifying an injection point for each service 34 of the one or more services 34, identifying one or more dependencies for each service 34 of the one or more services 34, and obtaining a reference to each instance of each service 34 of the one or more services 34.

In one example, to generate the one or more serialized data structures 58, 62 representing the state of each service 34 of the one or more services 34, the one or more state serializers 304 are to serialize each injection point for each service 34 of the one or more services 34 into the one or more serialized data structures 58, 62, and serialize the one or more dependencies for each service 34 of the one or more services 34 into the one or more serialized data structures 58, 62.

Figure 9:
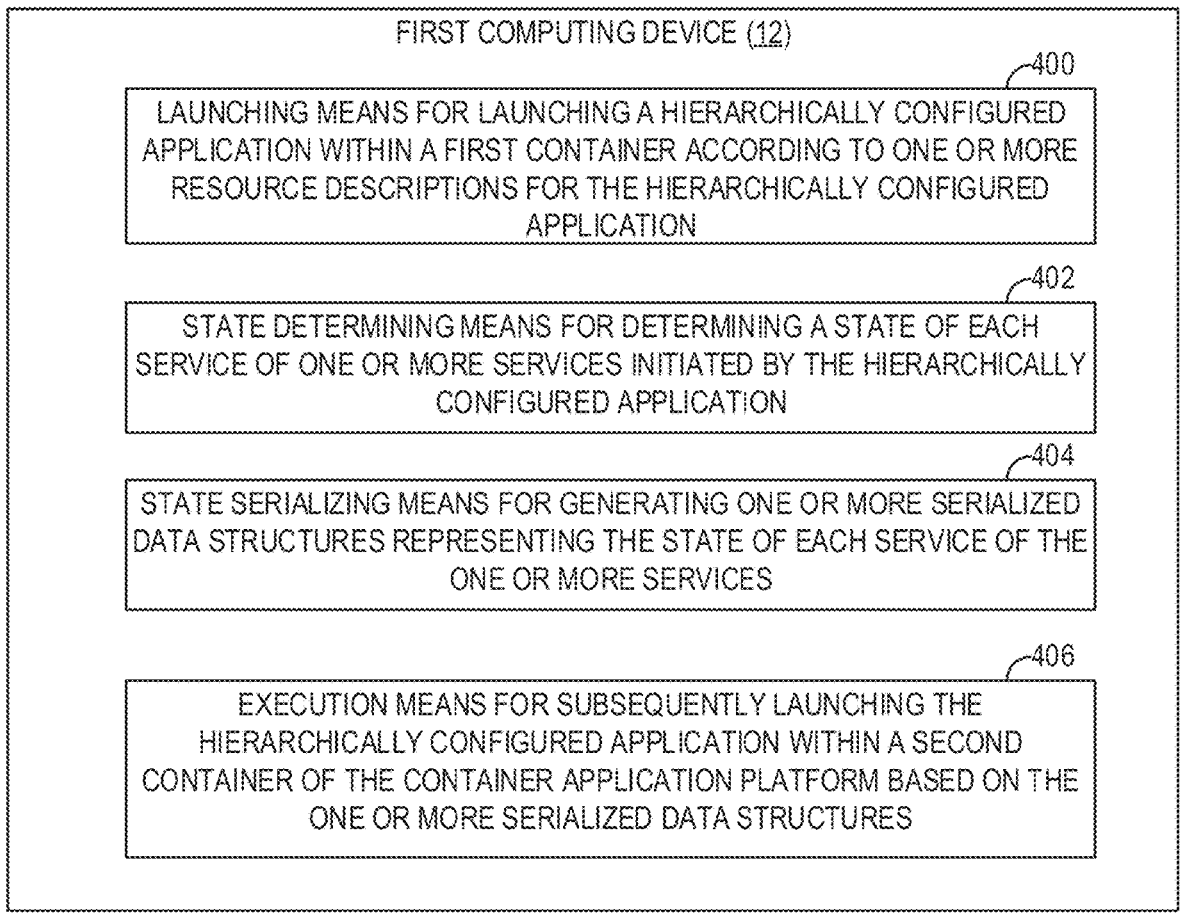
FIG. 9 is a block diagram of a computing device suitable for implementing examples according to yet another example.

FIG. 9 is a block diagram of a computing device suitable for implementing examples according to another example. In this example, the first computing device 12 includes a launching means 400 for launching the hierarchically configured application 30 within the first container 26 according to the one or more resource descriptions 32 for the hierarchically configured application 30. In some examples, the launching means 400 may be carried out by the bootstrap 100 as discussed above with regard to FIG. 5A. The first computing device 12 also includes a state determining means 402 for determining a state of each service 34 of the one or more services 34 initiated by the hierarchically configured application 30. In some examples, the state determining means 402 may be carried out by the service container 108 and the externalizer registry 110 as identified at steps 154-160 of FIG. 5D, above. The first computing device 12 also includes a state serializing means 404 for generating one or more serialized data structures 58, 62 representing the state of each service 34 of the one or more services 34. In some examples, the state serializing means 404 may be carried out by the service container 108, the external registry 110, and the service dump 112, as identified at steps 154-160 of FIG. 5D, above. The first computing device 12 also includes an execution means 406 for subsequently launching the hierarchically configured application 30 within the second container 28 of the container application platform 24 based on the one or more serialized data structures 58, 62. In some examples, the execution means 406 may be carried out by the container application platform 24 as discussed at block 192 of FIG. 6C.

The following are additional examples. Example 1 is a computing device comprising a module for launching a hierarchically configured application within a first container of a container application platform according to one or more resource descriptions for the hierarchically configured application, a module for determining a state of each service of one or more services initiated by the hierarchically configured application, a module for generating one or more serialized data structures representing the state of each service of the one or more services, and a module for subsequently launching the hierarchically configured application within a second container of the container application platform based on the one or more serialized data structures.

Example 2 is a computing device, comprising a memory and a processor device communicatively coupled to the memory, to launch a hierarchically configured application within a container of a container application platform according to one or more resource descriptions for the hierarchically configured application, determine a state of each service of one or more services initiated by the hierarchically configured application, and generate one or more serialized data structures representing the state of each service of the one or more services.

Example 3 is the computing device of Example 2, wherein the container comprises a provisioning container of the container application platform.

Example 4 is the computing device of Example 2, wherein to determine the state of each service of the one or more services launched by the hierarchically configured application is to identify an injection point for each service of the one or more services, identify one or more dependencies for each service of the one or more services, and obtain a reference to each instance of each service of the one or more services.

Example 5 is the computing device of Example 4, wherein to generate the one or more serialized data structures representing the state of each service of the one or more services is to serialize each injection point for each service of the one or more services into the one or more serialized data structures, and serialize the one or more dependencies for each service of the one or more services into the one or more serialized data structures.

Example 6 is the computing device of Example 5, wherein to serialize each injection point and serialize the one or more dependencies is to serialize each injection point and serialize the one or more dependencies using a domain-specific language.

Example 7 is the computing device of Example 4, wherein to generate the one or more serialized data structures representing the state of each service of the one or more services is to serialize each reference to each instance of each service of the one or more services into the one or more serialized data structures.

Example 8 is the computing device of Example 7, wherein to serialize each reference to each instance of each service is to serialize each reference to each instance of each service using a service externalizer.

Example 9 is a computing device, comprising a memory and a processor device communicatively coupled to the memory, to launch a hierarchically configured application within a container of a container application platform based on one or more serialized data structures representing a state of one or more services of a hierarchically configured application.

Example 10 is the computing device of Example 9, wherein the container comprises an execution container of the container application platform.

Example 11 is the computing device of Example 1, wherein to subsequently launch the hierarchically configured application within the container of the container application platform based on the one or more serialized data structures is to deserialize each instance of each service of the one or more services from the one or more serialized data structures, determine based on the one or more serialized data structures whether one or more dependencies exist for each instance of each service of the one or more services, set the one or more dependencies responsive to determining that the one or more dependencies exist for each instance of each service of the one or more services, install the hierarchically configured application into the container of the container application platform, and execute the hierarchically configured application within the container.

Example 12 is a computing system, comprising a launcher to launch a hierarchically configured application within a first container according to one or more resource descriptions for the hierarchically configured application; a state determiner to determine a state of each service of one or more services initiated by the hierarchically configured application; one or more state serializers to generate one or more serialized data structures representing the state of each service of the one or more services; and an executor to subsequently launch the hierarchically configured application within a second container based on the one or more serialized data structures.

Example 13 is the computing system of Example 12, further comprising a resource description register to register a plurality of resource descriptions.

Example 14 is the computing system of Example 12 further comprising a deployment unit processor register to register a plurality of deployment unit processors.

Example 15 is the computing system of Example 12 wherein to determine the state of each service of the one or more services initiated by the hierarchically configured application, the state determiner is to identify an injection point for each service of the one or more services; identify one or more dependencies for each service of the one or more services; and obtain a reference to each instance of each service of the one or more services.

Example 16 is the computing system of Example 15 wherein to generate the one or more serialized data structures representing the state of each service of the one or more services, the one or more state serializers are to serialize each injection point for each service of the one or more services into the one or more serialized data structures; and serialize the one or more dependencies for each service of the one or more services into the one or more serialized data structures.

Example 17 is the computing system of Example 12 wherein the launcher is to launch the hierarchically configured application within the first container in a model mode of the hierarchically configured application.

Example 18 is the computing system of Example 12 wherein the executor is to subsequently launch the hierarchically configured application within the second container in a light mode of the hierarchically configured application.

Example 19 is a computing system comprising a launching means for launching a hierarchically configured application within a first container according to one or more resource descriptions for the hierarchically configured application; a state determining means for determining a state of each service of one or more services initiated by the hierarchically configured application; a state serializing means for generating one or more serialized data structures representing the state of each service of the one or more services; and an execution means for subsequently launching the hierarchically configured application within a second container of the container application platform based on the one or more serialized data structures.

Example 20 is the computing system of Example 19 wherein the execution means further comprises a deserializing means for deserializing each instance of each service of the one or more services from the one or more serialized data structures; a dependency determining means for determining, based on the one or more serialized data structures, whether one or more dependencies exist for each instance of each service of the one or more services; a dependency setting means for setting the one or more dependencies responsive to determining that the one or more dependencies exist for each instance of each service of the one or more services; and an installing means for installing the hierarchically configured application into the second container of the container application platform.

What is claimed is:

1. A computing system, comprising:
   a first computing device comprising a first memory and a first processor device communicatively coupled to the first memory; and
   a second computing device comprising a second memory and a second processor device communicatively coupled to the second memory;
   the first computing device to:
      launch a hierarchically configured application within a first container of a container application platform according to one or more resource descriptions for the hierarchically configured application;
      determine a state of each service of one or more services initiated by the hierarchically configured application; and
      generate one or more serialized data structures representing the state of each service of the one or more services; and
   the second computing device to subsequently launch the hierarchically configured application within a second container of the container application platform based on the one or more serialized data structures;
   wherein to subsequently launch the hierarchically configured application within the second container of the container application platform based on the one or more serialized data structures is to:
      deserialize each instance of each service of the one or more services from the one or more serialized data structures;
      determine, based on the one or more serialized data structures, whether one or more dependencies exist for each instance of each service of the one or more services;
      responsive to determining that one or more dependencies exist for each instance of each service of the one or more services, set the one or more dependencies;
      install the hierarchically configured application into the second container of the container application platform; and
      execute the hierarchically configured application within the second container.

2. A method comprising:
   launching a hierarchically configured application within a first container of a container application platform according to one or more resource descriptions for the hierarchically configured application;
   determining a state of each service of one or more services initiated by the hierarchically configured application;
   generating one or more serialized data structures representing the state of each service of the one or more services; and
   subsequently launching the hierarchically configured application within a second container of the container application platform based on the one or more serialized data structures;
   wherein subsequently launching the hierarchically configured application within the first container of the container application platform based on the one or more serialized data structures comprises:
      deserializing each instance of each service of the one or more services from the one or more serialized data structures;
      determining, based on the one or more serialized data structures, whether one or more dependencies exist for each instance of each service of the one or more services;
      responsive to determining that one or more dependencies exist for each instance of each service of the one or more services, setting the one or more dependencies;
      installing the hierarchically configured application into the second container of the container application platform; and
      executing the hierarchically configured application within the second container.

* * * * *